United States Patent

Mita (10) Patent No.: US 10,124,801 B2
(45) Date of Patent: Nov. 13, 2018

(54) CONTROL APPARATUS FOR FOUR-WHEEL DRIVE VEHICLE

(71) Applicant: JTEKT CORPORATION, Osaka-shi (JP)

(72) Inventor: Masaki Mita, Chiryu (JP)

(73) Assignee: JTEKT CORPORATION, Osaka-shi (JP)

(*) Notice: Subject to any disclaimer, the term of this patent is extended or adjusted under 35 U.S.C. 154(b) by 234 days.

(21) Appl. No.: 14/950,477

(22) Filed: Nov. 24, 2015

(65) Prior Publication Data

US 2016/0152238 A1 Jun. 2, 2016

(30) Foreign Application Priority Data

Nov. 28, 2014 (JP) .................. 2014-241658

(51) Int. Cl.
 *B60W 30/18* (2012.01)
 *B60K 23/08* (2006.01)
 (Continued)

(52) U.S. Cl.
 CPC ......... *B60W 30/18* (2013.01); *B60K 23/0808* (2013.01); *B60K 26/04* (2013.01);
 (Continued)

(58) Field of Classification Search
 CPC . B60W 30/18; B60W 30/18027; B60K 23/08; B60K 23/0808; B60K 23/085; B60K 26/04
 See application file for complete search history.

(56) References Cited

U.S. PATENT DOCUMENTS 5,010,974 A * 4/1991 Matsuda ............ B60K 23/0808
 180/233
5,132,908 A * 7/1992 Eto .................... B60K 23/0808
 180/197

(Continued)

FOREIGN PATENT DOCUMENTS

GB 2 407 804 A 5/2005
JP 02-055725 A 2/1990

(Continued)

*Primary Examiner* — Joseph M Rocca
*Assistant Examiner* — Maurice L Williams
(74) *Attorney, Agent, or Firm* — Oblon, McClelland, Maier & Neustadt, L.L.P.

(57) ABSTRACT

A four-wheel drive vehicle includes front wheels, rear wheels to which a driving force of an engine is transmitted via a propeller shaft, a dog clutch that enables blocking of transmission of the driving force from the engine to the propeller shaft, and a multi-disc clutch that enables blocking of transmission of the driving force from the propeller shaft to the rear wheels. During two-wheel driving in which the transmission of the driving force through the dog clutch and the multi-disc clutch is blocked, an ECU in the four-wheel drive vehicle calculates an estimated driving force estimated to be transmitted to the front wheels based on a vehicle speed and an amount of acceleration operation. The ECU allows the multi-disc clutch to transmit the driving force when the estimated driving force is larger than a driving force threshold defined according to a slip limit torque for the front wheels.

6 Claims, 9 Drawing Sheets

(51) Int. Cl.
*B60K 26/04* (2006.01)
*B60K 17/35* (2006.01)

(52) U.S. Cl.
CPC ... *B60W 30/18027* (2013.01); *B60K 17/3515* (2013.01); *B60K 2023/085* (2013.01); *B60K 2026/043* (2013.01); *B60L 2260/26* (2013.01); *B60L 2260/28* (2013.01); *B60L 2260/44* (2013.01); *B60W 2510/0208* (2013.01)

(56) References Cited

U.S. PATENT DOCUMENTS

| | | | |
|---|---|---|---|
| 8,215,440 | B2 | 7/2012 | Hoffmann et al. |
| 2003/0036837 | A1* | 2/2003 | Katayama ......... B60K 23/0808 701/69 |
| 2005/0278104 | A1* | 12/2005 | Masuda ............... B60K 6/44 701/69 |
| 2007/0112499 | A1* | 5/2007 | Matsuno ............ B60W 10/119 701/93 |
| 2009/0018738 | A1* | 1/2009 | Kuwahara .......... F16H 61/0213 701/65 |
| 2010/0089685 | A1* | 4/2010 | Quehenberger ...... F16D 27/118 180/383 |
| 2010/0094519 | A1* | 4/2010 | Quehenberger ....... B60K 17/35 701/69 |
| 2011/0275470 | A1* | 11/2011 | Ekonen .................. B60K 17/35 475/198 |
| 2012/0116545 | A1* | 5/2012 | Yasui .................. G05B 13/042 700/30 |
| 2013/0013161 | A1* | 1/2013 | Otsubo ................. B60W 10/06 701/52 |
| 2013/0226421 | A1 | 8/2013 | Horaguchi et al. |
| 2014/0058638 | A1* | 2/2014 | Taniguchi ............ B60W 10/06 701/69 |
| 2014/0129105 | A1* | 5/2014 | Shigeta .................. B60K 17/35 701/69 |
| 2014/0136062 | A1* | 5/2014 | Mita ...................... B60K 23/08 701/65 |
| 2014/0297141 | A1* | 10/2014 | Nihanda ............ B60K 23/0808 701/58 |
| 2015/0073670 | A1* | 3/2015 | Matsuno ................ B60K 17/35 701/53 |

FOREIGN PATENT DOCUMENTS

| | | |
|---|---|---|
| JP | 2002-370557 A | 12/2002 |
| JP | 2009-166706 | 7/2009 |
| JP | 2014-54880 | 3/2014 |

* cited by examiner

FIG. 1
(FIRST EMBODIMENT)

FIG. 2A
(FIRST EMBODIMENT)

FIG. 2B

FIG. 3
(FIRST EMBODIMENT)

FIG.4
(FIRST EMBODIMENT)

FIG. 5
(FIRST EMBODIMENT)

FIG. 7

FIG.8
(SECOND EMBODIMENT)

FIG. 9
(THIRD EMBODIMENT)

CONTROL APPARATUS FOR FOUR-WHEEL DRIVE VEHICLE

INCORPORATION BY REFERENCE

The disclosure of Japanese Patent Application No. 2014-241658 filed on Nov. 28, 2014 including the specification, drawings and abstract, is incorporated herein by reference in its entirety.

BACKGROUND OF THE INVENTION

1. Field of the Invention

The invention relates to a control apparatus for a four-wheel drive vehicle.

2. Description of Related Art

A type of four-wheel drive vehicle constantly transmits a driving force of an engine that is a driving source to main driving wheels that are first driving wheels of front and rear wheels, while transmitting, according to a traveling state, the driving force of the engine to auxiliary driving wheels that are second driving wheels of the front and rear wheels. An example of this type of four-wheel drive vehicle enables blocking of transmission of the driving force between the engine and a propeller shaft that transmits the driving force to the auxiliary driving wheels and between the propeller shaft and the auxiliary driving wheels, during two-wheel driving in which the driving force of the engine is transmitted only to the main driving wheels (see Japanese Patent Application Publication Nos. 2009-166706 (JP 2009-166706 A) and 2014-054880 (JP 2014-054880 A)). This type of four-wheel drive vehicle has recently been gathering attention because the vehicle allows rotation of the propeller shaft to be stopped during the two-wheel driving to suppress traveling resistance resulting from rotational resistance to the propeller shaft, enabling a reduction in fuel consumption.

The four-wheel drive vehicle described in JP 2009-166706 P automatically sets up a two-wheel driving state during traveling in a four-wheel driving state if a slip rate of the main driving wheels is equal to or lower than a predetermined two-wheel driving switching value, and automatically returns to the four-wheel driving state during traveling in the two-wheel driving state if the slip rate exceeds a predetermined four-wheel driving switching value.

The four-wheel drive vehicle described in JP 2014-054880 A has a center clutch between an output shaft of a transmission and the propeller shaft, and a pair of rear clutches between the pair of rear wheels serving as the auxiliary driving wheels and a rear differential apparatus. A control unit that controls the center clutch and the rear clutches releases the center clutch and the rear clutches to set up a two-wheel driving mode (FWD mode) in which the driving force is transmitted only to the front wheels when a road is estimated to be in a high friction state, and engages the center clutch and the rear clutches to set up a four-wheel driving mode (AWD mode) in which the driving force is transmitted to the front wheels and the rear wheels when the road is estimated to be in a low friction state.

The control unit engages the center clutch when the road is estimated to be in a medium friction state that is intermediate between the high friction state and the low friction state, while releasing the rear clutches to set up a standby mode in which the propeller shaft is rotated by a torque transmitted through the center clutch. In the standby mode, when need arises to quickly engage the rear clutches, vibration caused by the moment of rotary inertia of the propeller shaft and the like can be suppressed.

In the four-wheel drive vehicle described in JP 2009-166706 A, for example, when a quick acceleration in the two-wheel driving state rapidly increases the driving force transmitted to the main driving wheels, the slip rate of the main driving wheels becomes higher to cause the four-wheel driving state to be set up. However, the clutches are engaged after the increase in slip rate, leading to a temporal delay. Thus, a slip of the main driving wheels before setup of the four-wheel driving state may temporarily degrade traveling stability.

In the four-wheel drive vehicle described in JP 2014-054880 A, when the road is in the medium friction state, the propeller shaft rotates even in the two-wheel driving state, allowing a quick shift to the four-wheel driving state. However, for example, a situation where a quick shift from the two-wheel driving state to the four-wheel driving state needs to be achieved by performing a quick acceleration may occur even when the road is in the high friction state. In such a case, the temporal delay in the shift to the four-wheel driving state may rapidly increase the driving force transmitted to the main driving wheels, leading to a higher likelihood of slip of the main driving wheels.

SUMMARY OF THE INVENTION

An object of the present invention is to provide a control apparatus for a four-wheel drive vehicle that enables rotation of a driving shaft that transmits a driving force to auxiliary driving wheels to be stopped during traveling in a two-wheel driving state, while enabling a quick shift to a four-wheel driving state at the time of a quick acceleration.

In an aspect of the present invention, a control apparatus for a four-wheel drive vehicle includes an estimated driving force calculating circuit that calculates an estimated driving force estimated to be transmitted to main driving wheels to which a driving force of a driving source is constantly transmitted. The four-wheel drive vehicle includes the main driving wheels, auxiliary driving wheels to which the driving force of the driving source is transmitted via a driving shaft that transmits the driving force in a front-rear direction of the vehicle, a first clutch that enables blocking of transmission of the driving force from the driving source to the driving shaft, and a second clutch that enables blocking of transmission of the driving force from the driving shaft to the auxiliary driving wheels. The control apparatus is mounted in the four-wheel drive vehicle to control the first and second clutches. During two-wheel driving in which the transmission of the driving force through the first and second clutches is blocked, the estimated driving force calculating circuit calculates the estimated driving force applied to the main driving wheels based on a vehicle speed and an amount of acceleration operation performed by a driver. During the two-wheel driving, the control apparatus allows one of the first and second clutches to transmit the driving force when the estimated driving force is larger than a driving force threshold defined according to a slip limit torque for the main driving wheels.

The control apparatus for the four-wheel drive vehicle in the above-described aspect enables rotation of the driving shaft that transmits the driving force to the auxiliary driving wheels to be stopped during traveling in the two-wheel driving state, while enabling a quick shift to the four-wheel driving state at the time of a quick acceleration.

BRIEF DESCRIPTION OF THE DRAWINGS

The foregoing and further features and advantages of the invention will become apparent from the following descrip

DETAILED DESCRIPTION OF EMBODIMENTS

Figure 1:
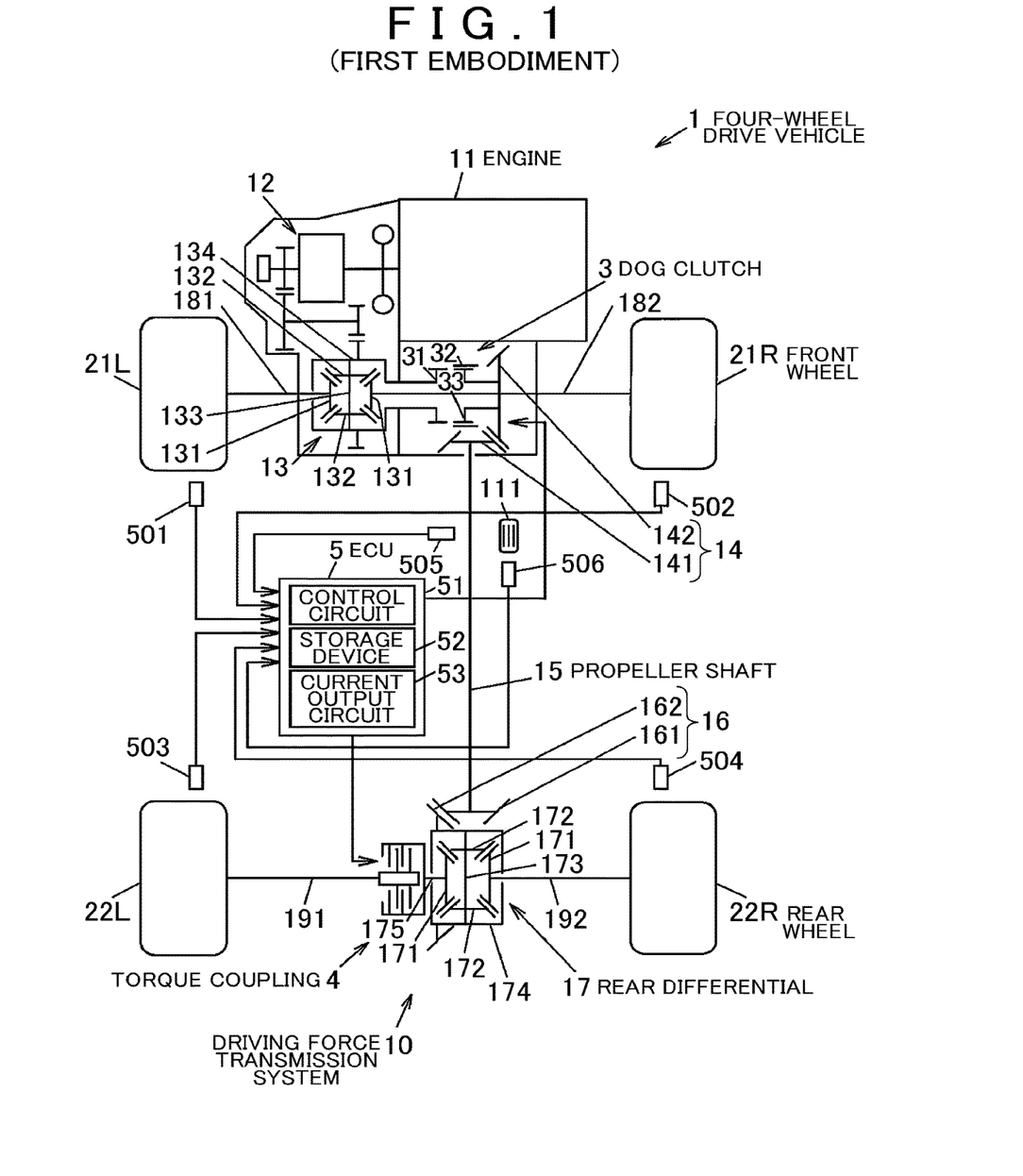
- FIG. 1 is a schematic diagram depicting an example of configuration of a four-wheel drive vehicle with a control apparatus according to an embodiment of the present invention mounted therein.

Embodiments of the present invention will be described with reference to FIGS. 1 to 7. FIG. 1 is a schematic diagram depicting an example of configuration of a four-wheel drive vehicle with a control apparatus according to an embodiment of the present invention mounted therein.

As depicted in FIG. 1, a four-wheel drive vehicle 1 includes an engine 11 serving as a driving source that generates a torque for traveling, a transmission 12 that adjusts an output from the engine 11, a right and a left front wheels 21R and 21L to which a driving force of the engine 11 adjusted by the transmission 12 is constantly transmitted, and a pair of a right and left rear wheels 22R and 22L to which the driving force of the engine 11 is transmitted according to a traveling state. That is, in the present embodiment, the right and left front wheels 21R and 21L are main driving wheels, and the right and left rear wheels 22R and 22L are auxiliary driving wheels. The driving force of the engine 11 adjusted by the transmission 12 is transmitted to the right and left rear wheels 22R and 22L serving as the auxiliary driving wheels, via a propeller shaft 15 extending in a front-rear direction of the four-wheel drive vehicle 1 to serve as a driving shaft.

The four-wheel drive vehicle 1 can be switched between a four-wheel driving state where the driving force of the engine 11 is transmitted to the right and left front wheels 21R and 21L and the right and left rear wheels 22R and 22L and a two-wheel driving state where the driving force is transmitted only to the right and left front wheels 21R and 21L. The right and left front wheels 21R and 21L (right front wheel 21R and left front wheels 21L) are hereinafter sometimes referred to as front wheels 21. The right and left rear wheels 22R and 22L (right rear wheel 22R and left rear wheels 22L) are hereinafter sometimes referred to as rear wheels 22.

As a driving force transmission system (drive line) 10 that transmits the driving force of the engine 11 adjusted by the transmission 12 to the right and left front wheels 21R and 21L and the right and left rear wheels 22R and 22L, the four-wheel drive vehicle 1 has a front differential 13, a dog clutch 3, a front wheel gear mechanism 14, propeller shaft 15, a rear wheel gear mechanism 16, a rear differential 17, a torque coupling 4, right and left front wheel drive shafts 182 and 181, and right and left rear wheel drive shafts 192 and 191.

The four-wheel drive vehicle 1 is further equipped with an electric control unit (ECU) 5 serving as a control apparatus that controls the dog clutch 3 and the torque coupling 4. The four-wheel drive vehicle 1 is also provided with a first rotation speed sensor 501 that detects a rotation speed of the left front wheel 21L, a second rotation speed sensor 502 that detects a rotation speed of the right front wheel 21R, a third rotation speed sensor 503 that detects a rotation speed of the left rear wheel 22L, a fourth rotation speed sensor 504 that detects a rotation speed of the right rear wheel 22R, a fifth rotation speed sensor 505 that detects a rotation speed of the propeller shaft 15, and an accelerator pedal sensor 506 configured to detect the amount of acceleration operation (accelerator opening degree) of an accelerator pedal 111 on which a driver steps for operation and serving an acceleration operator. The ECU 5 can acquire detection results from the sensors.

The four-wheel drive vehicle 1 is in the four-wheel driving state when transmissions of the driving force through the dog clutch 3 and through the torque coupling 4 are both performed and is in the two-wheel driving state when at least one of the transmissions of the driving force through the dog clutch 3 and through the torque coupling 4 is not performed. In order to suppress traveling resistance resulting from rotational resistance to the propeller shaft 15 to reduce fuel consumption, the ECU 5 in the present embodiment enables blocking of both transmissions of the driving force through the dog clutch 3 and through the torque coupling 4 to stop rotation of the propeller shaft 15. The traveling resistance resulting from the rotational resistance to the propeller shaft 15 includes rotational resistance to, for example, a bearing that supports the propeller shaft 15 so as to allow the propeller shaft 15 to rotate and stirring resistance to a lubricant in the front wheel gear mechanism 14 and the rear wheel gear mechanism 16.

The driving force of the engine 11 is transmitted to the right and left front wheels 21R and 21L via the transmission 12, the front differential 13, and the right and left front wheel drive shafts 182 and 181. The front differential 13 has a pair of side gears 131 coupled to the right and left front wheel drive shafts 182 and 181 so as to be inhibited from rotating relative to the right and left front wheel drive shafts 182 and 181, a pair of pinion gears 132 that meshes with the side gears 131 such that a gear axis of the pinion gears 132 is orthogonal to a gear axis of the side gears 131, a pinion gear shaft 133 that supports the pinion gears 132, and a front differential case 134 that houses the side gears 131, the pinion gears 132, and the pinion gear shaft 133.

The driving force of the engine 11 is transmitted to the propeller shaft 15 via the transmission 12, the front differential case 134 of the front differential 13, the dog clutch 3, and the front wheel gear mechanism 14. The driving force of the engine 11 transmitted to the propeller shaft 15 is further transmitted to a rear differential 17 via the rear wheel gear mechanism 16 and from the rear differential 17 to the left rear wheel 22L via the torque coupling 4 and the left rear wheel drive shaft 191 or from the rear differential 17 to the right rear wheel 22R via the right rear wheel drive shaft 192.

The rear differential 17 has a pair of side gears 171, a pair of pinion gears 172 that meshes the side gears 171 such that a gear axis of the pinion gears 172 is orthogonal to a gear axis of the side gears 171, a pinion gear shaft 173 that supports the pinion gears 172, and a rear differential case 174 that houses the side gears 171, the pinion gears 172, and the pinion gear shaft 173. A side gear shaft 175 that allows coupling of the torque coupling 4 is coupled to the left side gear 171 so as to be inhibited from rotating relative to the left side gear 171. The right rear wheel drive shaft 192 is coupled to the right side gear 171 so as to be inhibited from rotating relative to the right side gear 171.

The propeller shaft 15 has a front end pinion gear 141 coupled thereto at a driving force transmission upstream-side (engine 11-side) end thereof and a rear end pinion gear 161 coupled thereto at a driving force transmission downstream-side (rear wheel 22-side) end thereof. The front end pinion gear 141 meshes with a ring gear 142 serving as an output member of the dog clutch 3. The rear end pinion gear 161 meshes with a ring gear 162 fixed to the rear differential case 174. The front end pinion gear 141 and the ring gear 142 form the front wheel gear mechanism 14. The rear end pinion gear 161 and the ring gear 162 form the rear wheel gear mechanism 16.

Figure 2A:
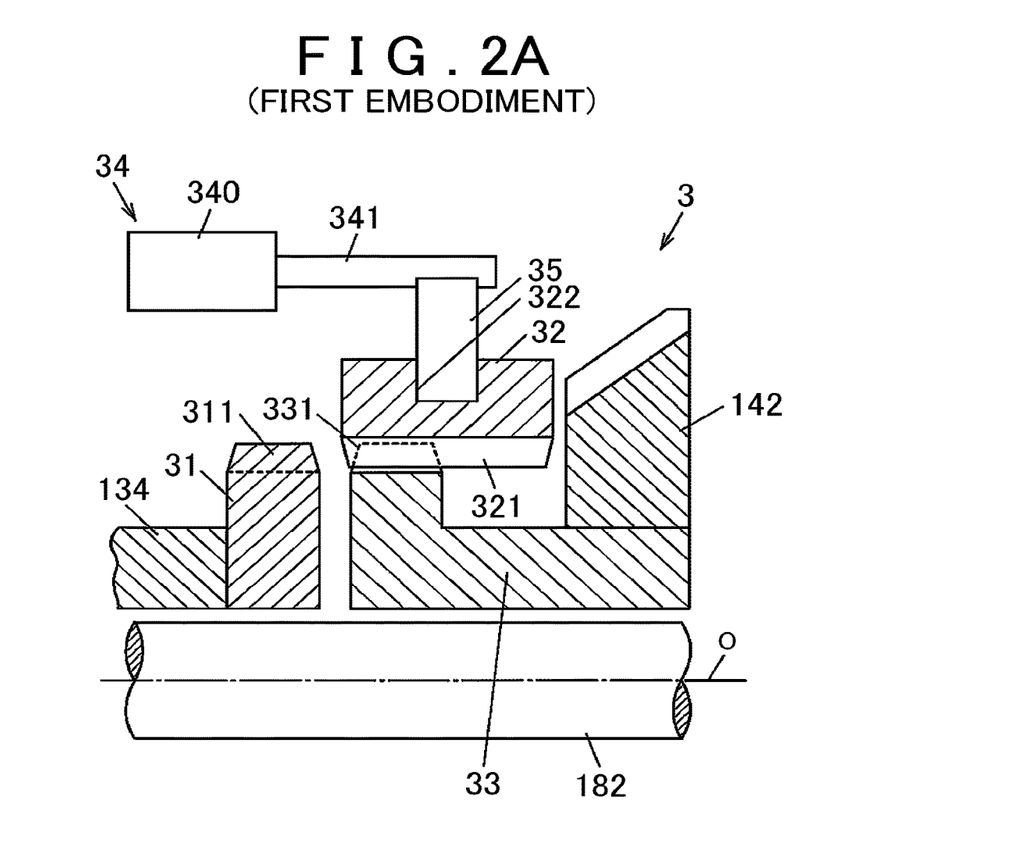
FIG. 2A is a sectional view depicting a configuration example of a dog clutch and a peripheral portion thereof.
Figure 2B:
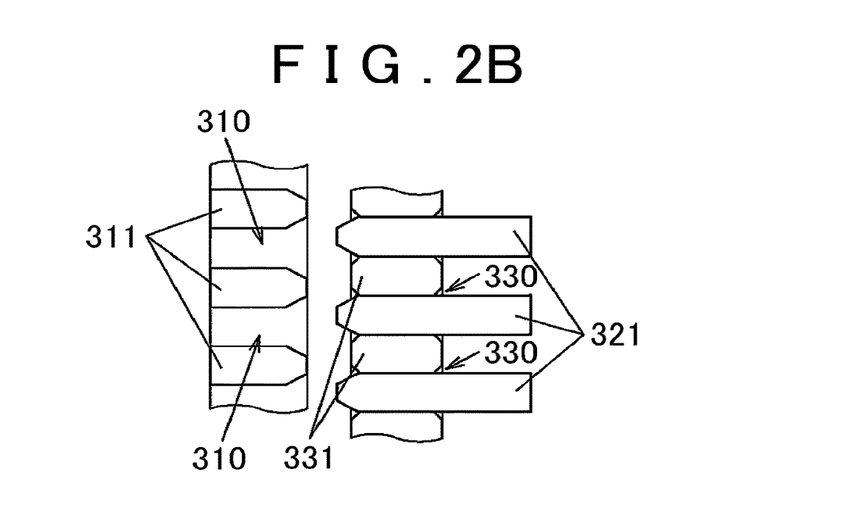
FIG. 2B is a diagram schematically depicting a meshing portion of the dog clutch in a released state.

FIG. 2A is a sectional view depicting the dog clutch 3 and a peripheral portion thereof. FIG. 2B is a diagram illustrating a meshing portion of the dog clutch 3 in a released state. FIG. 2A depicts the area of an upper half of the front differential case 134 in the dog clutch 3 with respect to an axis of rotation O.

The dog clutch 3 has a first rotation member 31 fixed to an axial end of the front differential case 134, a second rotation member 32 that is movable in the axial direction with respect to the first rotation member 31, a third rotation member to which the ring gear 142 of the front wheel gear mechanism 14 is fixed, an actuator 34 that moves the second rotation member 32 forward and backward with respect to the first rotation member 31, and a shift fork 35 that transmits a moving force of the actuator 34 to the second rotation member 32. The dog clutch 3 is an aspect of a first clutch in the present invention that enables blocking of transmission of the driving force from the engine 11 to the propeller shaft 15.

The first rotation member 31 is shaped like a ring through which the right front wheel drive shaft 182 is inserted and has on an outer peripheral surface of the first rotation member 31 a plurality of spline teeth 311 formed to extend parallel to the axis of rotation O of the front differential case 134. For each pair of circumferentially adjacent spline teeth 311 of the plurality of spline teeth 311, a recess portion 330 is formed between the spline teeth 311.

The third rotation member 33 is shaped like a tube through which the right front wheel drive shaft 182 is inserted and can rotate relative to and coaxially with the first rotation member 31. The third rotation member 33 also has on an outer peripheral surface thereof a plurality of spline teeth 331 formed to extend parallel to the axis of rotation O of the front differential case 134. For each pair of circumferentially adjacent spline teeth 331 of the plurality of spline teeth 331, a recess portion 330 is formed between the spline teeth 331.

The second rotation member 32 is a sleeve-like coupling member supported radially outside the first rotation member 31 and the third rotation member 33 so as to be movable in the axial direction coaxially with the first rotation member 31 and the third rotation member 33. On an inner peripheral surface of the second rotation member 32, a plurality of spline teeth 321 is formed which can engage with the spline teeth 311 of the first rotation member 31 and the spline teeth 331 of the third rotation member 33.

The second rotation member 32 constantly engages with the third rotation member 33 and can move in the axial direction with respect to the third rotation member 33. More specifically, the spline teeth 321 of the second rotation member 32 mesh with the recess portions 330 of the third rotation member 33. With this meshing state maintained, the second rotation member 32 can move in the axial direction with respect to the third rotation member 33.

When the second rotation member 32 is moved toward the first rotation member 31 by the actuator 34, the spline teeth 321 of the second rotation member 32, serving as protruding portions, mesh with the recess portions 310 of the first rotation member 31 to couple the second rotation member 32 to the first rotation member 31 so as to inhibit the second rotation member 32 and the first rotation member 31 from rotating relative to each other. Thus, the first rotation member 31 and the third rotation member 33 are coupled together via the second rotation member 32 so as to be inhibited from rotating relative to each other. The driving force of the engine 11 can be transmitted from the first rotation member 31 to the third rotation member 33.

On the other hand, when the second rotation member 32 is separated from the first rotation member 31, the meshing between the plurality of spline teeth 321 of the second rotation member 32 and the recess portions 310 of the first rotation member 31 is released, allowing the relative rotation between the first rotation member 31 and the third rotation member 33. Thus, the transmission of the driving force from the first rotation member 31 to the third rotation member 33 is blocked.

The actuator 34 includes an electromagnetic actuator that moves a movable iron core by a magnetic force generated by passing a current through an exciting coil. In the actuator 34, a shaft 341 moves in the axial direction with respect to a main body portion 340 to move the second rotation member 32 forward and backward via the shift fork 35 coupled to the shaft 341. The shift fork 35 slidably engages with an annular groove 322 formed in an outer periphery of the second rotation member 32 to move the second rotation member 32 forward and backward parallel to the axis of rotation O of the front differential case 134.

Figure 3:
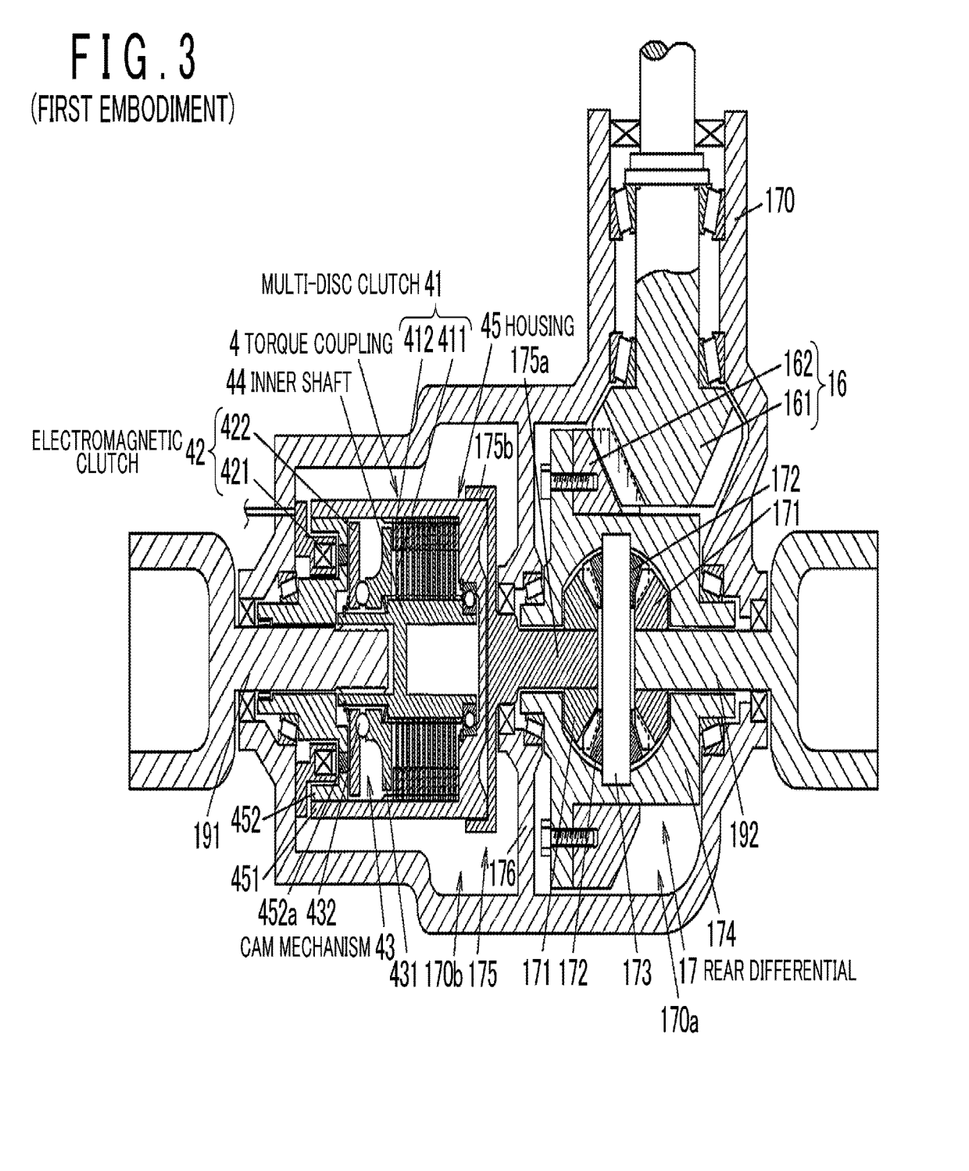
FIG. 3 is a schematic diagram depicting an example of configuration of a torque coupling and a peripheral portion thereof.

FIG. 3 is a schematic diagram depicting an example of configuration of the torque coupling 4 and a peripheral portion thereof. The torque coupling 4 has a multi-disc clutch 41, an electromagnetic clutch 42, a cam mechanism 43, an inner shaft 44, and a housing 45 that houses the multi-disc clutch 41, the electromagnetic clutch 42, the cam mechanism 43, and the inner shaft 44. The torque coupling 4 is housed in a differential carrier 170 together with the rear wheel gear mechanism 16 and the rear differential 17.

A space in the differential carrier 170 is separated into a first space 170a and a second space 170b in a liquid tight manner by a partition wall 176. The first space 170a with the rear wheel gear mechanism 16 and the rear differential 17 arranged therein is filled with gear oil suitable for lubrication of gears (not depicted in the drawings) at a predetermined filling rate. The second space 170b with the torque coupling 4 arranged therein is filled, at a predetermined filling rate, with a lubricant (not depicted in the drawings) suitable for lubrication of an inner clutch plate 411 and an outer clutch plate 412 described below.

The side gear shaft 175 integrally has a shaft portion 175a coupled to one of the side gears 171 of the rear differential 17 at one end of the shaft portion 175a and a flange portion 175b provided at the other end of the shaft portion 175a. The shaft portion 175a is inserted through the partition wall 176. The torque coupling 4 enables adjustment of the driving force transmitted from the side gear shaft 175 to the left rear wheel drive shaft 191.

A housing 45 for the torque coupling 4 includes a first housing member 451 and a second housing member 452 coupled together so as to be inhibited from rotating relative to each other. The first housing member 451 is shaped like a bottomed cylinder, and the second housing member 452 is arranged so as to occlude one end of the first housing member 451. The first housing member 451 of the housing 45 is coupled to the side gears 175 so as to be inhibited from rotating relative to the side gear shaft 175.

The multi-disc clutch 41 is arranged between the first housing member 451 of the housing 45 and the cylindrical inner shaft 44. The multi-disc clutch 41 includes a plurality of inner clutch plates 411 splined to an outer peripheral surface of the inner shaft 44 so as to be inhibited from rotating relative to the inner shaft 44, and a plurality of outer clutch plates 412 splined to an inner peripheral surface of the first housing member 451 so as to be inhibited from rotating relative to the first housing member 451. The inner clutch plates 411 and the outer clutch plates 412 are alternately arranged along the axial direction. The inner shaft 44 is splined to the left rear wheel drive shaft 191 so as to be inhibited from rotating relative to the left rear wheel drive shaft 191.

The electromagnetic clutch 42 has an annular electromagnetic coil 421 and an armature cam 422 and is arranged on the axis of rotation of the housing 45. The electromagnetic clutch 42 is configured such that the electromagnetic coil 421 generates an electromagnetic force to move the armature cam 422 toward the electromagnetic coil 421 to slide the armature cam 422 on the second housing member 452 in a frictional manner. In a central portion of the second housing member 452 in a radial direction thereof, a nonmagnetic ring 452a is provided which is a nonmagnetic material that prevents short-circuiting of a magnetic flux resulting from passage of a current through the electromagnetic coil 421.

The cam mechanism 43 includes the armature cam 422 as a cam member and has a main cam 431 located in parallel with the armature cam 422 along the axis of rotation of the housing 45 and a spherical cam follower 432 interposed between the main cam 431 and the armature cam 422. The cam mechanism 43 is configured such that the armature cam 422 is subjected to a turning force from the housing 45 as a result of the passage of a current through the electromagnetic coil 421 to convert the turning force into a pressing force that presses the multi-disc clutch 41 in the axial direction.

When a current is passed through the electromagnetic coil 421, the frictional force exerted between the armature cam 422 and the second housing member 452 increases to allow the main cam 431 to press the multi-disc clutch 41. Thus, a frictional force is exerted between the inner clutch plates 411 and the outer clutch plates 412 of the multi-disc clutch 41 to allow the driving force to be transmitted from the housing 45 to the inner shaft 44. That is, the multi-disc clutch 41 is an aspect of a second clutch in the present invention and enables blocking of transmission of the driving force from the propeller shaft 15 to the rear wheels 22. Furthermore, the multi-disc clutch 41 is a friction clutch that transmits a driving force by the friction between the clutch plates (between the inner clutch plates 411 and the outer clutch plates 412).

As described above, the torque coupling 4 allows the pressing force exerted on the multi-disc clutch 41 to be variably controlled according to the amount of current passed through the electromagnetic coil 421, thus enabling adjustment of the driving force transmitted from the side gear shaft 175 to the left rear wheel drive shaft 191.

When the multi-disc clutch 41 of the torque coupling 4 has a large capacity to transmit torque and the side gear shaft 175 and the left rear wheel drive shaft 191 rotate integrally, the left rear wheel drive shaft 191 and the propeller shaft 15 are coupled together so as to be able to transmit the torque via the rear wheel gear mechanism 16, the rear differential 17, the side gear shaft 175, and the torque coupling 4. Furthermore, the right rear wheel drive shaft 192 and the propeller shaft 15 are coupled together so as to be able to transmit the torque via the rear wheel gear mechanism 16 and the rear differential 17.

On the other hand, when no current is passed through the electromagnetic coil 421 to release the coupling between the side gear shaft 175 and the left rear wheel drive shaft 191, no torque is transmitted from the propeller shaft 15 to the left rear wheel drive shaft 191. Accordingly, no driving force is transmitted from the propeller shaft 15 to the right rear wheel drive shaft 192. The inhibition of transmission of the driving force to the right rear wheel drive shaft 192 is attributed to a characteristic of a general differential apparatus in which idle running of one of the side gears prevents torque from being transmitted to the other side gear.

As depicted in FIG. 1, the ECU 5 has a control circuit 51 that is an arithmetic circuit including a CPU, a storage device 52 that is a storage element such as a ROM or a RAM, and a current output circuit 53 that supplies a control current (exciting current) to the actuator 34 in the dog clutch 3 and the electromagnetic coil 421 in the torque coupling 4. The ECU 5 uses a first to a fifth rotation speed sensors 501 to 505 to enable sensing of rotation speeds of the right and left front wheels 21R and 21L, the right and left rear wheels 22R and 22L, and the propeller shaft 15, and uses the accelerator pedal sensor 506 to enable sensing of the amount of acceleration operation performed on the accelerator pedal 111. The ECU 5 further enables various pieces of information on the traveling state such as a steering angle and a yaw rate to be acquired via an in-vehicle communication network such as a controller area network (CAN).

The ECU 5 calculates a target torque to be transmitted to the rear wheels 22 based on the acquired information on the traveling state, and controls the torque coupling 4 such that the driving force corresponding to the target torque is transmitted to the rear wheels 22. In the two-wheel driving state, the dog clutch 3 and the multi-disc clutch 41 of the torque coupling 4 are released to stop rotation of the propeller shaft 15. When the two-wheel driving state is shifted to the four-wheel driving state, a control current is supplied to the electromagnetic coil 421 in the torque coupling 4 to transmit a torque of the rear wheels 22 to the propeller shaft 15 via the multi-disc clutch 41 and the rear differential 17, thus rotating the propeller shaft 15. Then, the first rotation member 31 and the second rotation member 32 of the dog clutch 3 are rotationally synchronized with each other. The control current is supplied to the actuator 34 in the dog clutch 3 to move the second rotation member 32 in the axial direction to mesh the spline teeth 321 of the second rotation member 32 with the recess portions 310 of the first rotation member 31. A functional configuration of the ECU 5 and a control method executed by the ECU 5 will be described below in detail.

Figure 4:
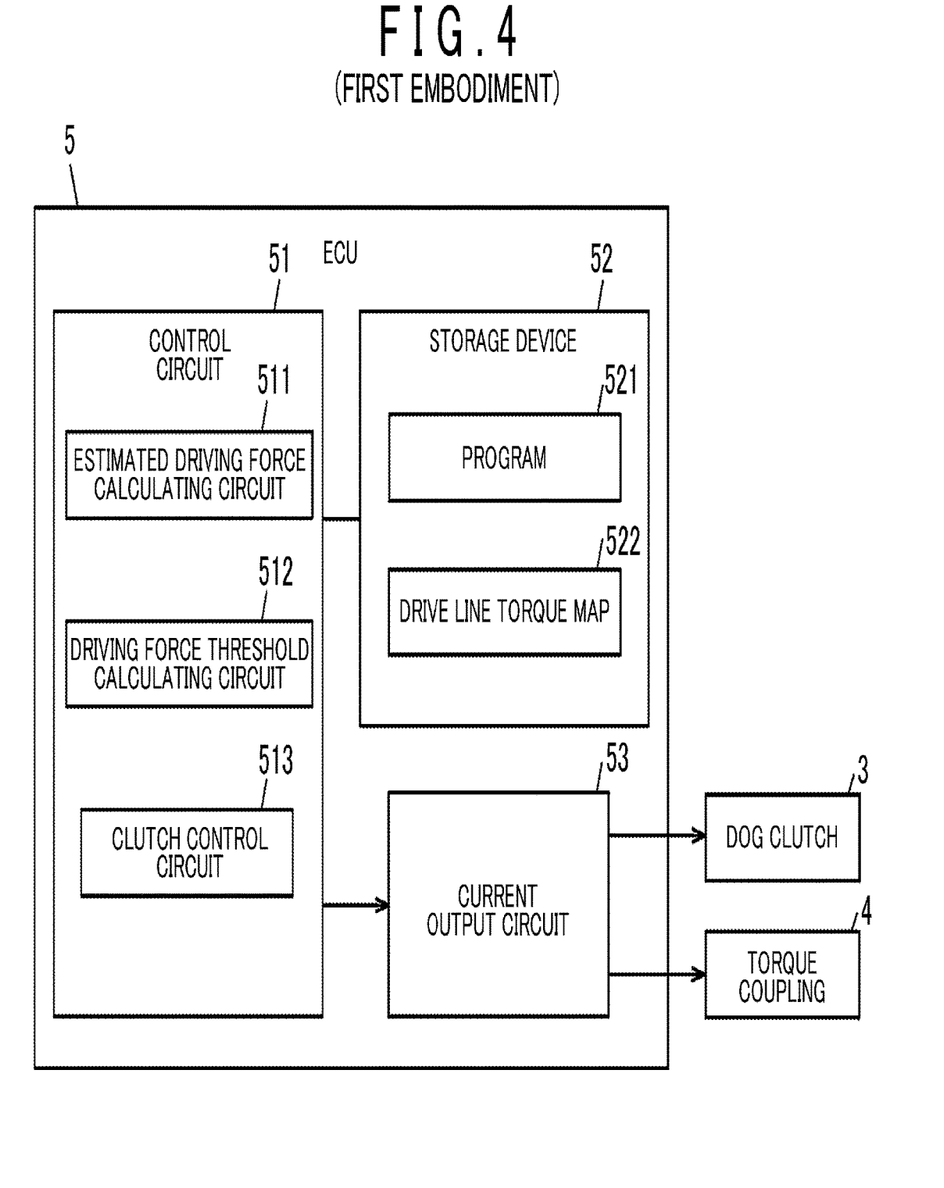
FIG. 4 is a block diagram depicting a functional configuration of an ECU.

FIG. 5 is a block diagram depicting the functional configuration of the ECU 5. The control circuit 51 provided in the ECU 5 functions as an estimated driving force calculating circuit 511, a driving force threshold calculating circuit 512, and a clutch control circuit 513 when the CPU operates based on a program 521 stored in the storage device 52. The storage device 52 stores a drive line torque map 522 described below, in addition to the program 521. The current output circuit 53 has a switching element such as a power transistor, to output a current to the dog clutch 3 and the torque coupling 4 based on a current instruction signal from the control circuit 51.

The estimated driving force calculating circuit 511 calculates an estimated driving force estimated to be transmitted to the front wheels 21 based on the amount of acceleration operation performed on the accelerator pedal 111 by the driver, during two-wheel driving in which the transmission of the driving force through the dog clutch 3 and the multi-disc clutch 41 in the torque coupling 4 is blocked. The driving force threshold calculating circuit 512 calculates a slip limit torque for the front wheels and then calculates a driving force threshold according to the slip limit torque. The clutch control circuit 513 allows the multi-disc clutch 41 in the torque coupling 4 to transmit the driving force when the estimated driving force calculated by the estimated driving force calculating circuit 511 during the two-wheel driving is larger than the driving force threshold calculated by the driving force threshold calculating circuit 512.

Figure 5:
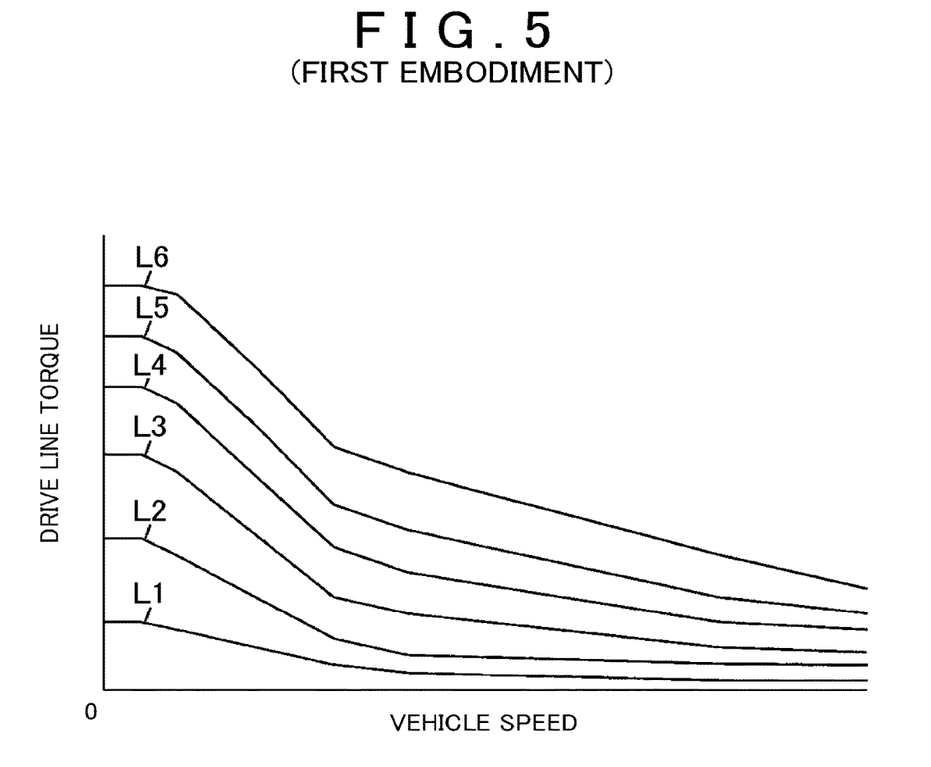
FIG. 5 is a diagram depicting an example of a drive line torque map referenced by the control apparatus functioning as an estimated driving force calculating circuit.

FIG. 5 is a diagram illustrating an example of the drive line torque map 522 referenced by the control circuit 51 functioning as the estimated driving force calculating circuit 511. The drive line torque map 522 defines the relationship between both a vehicle speed and the amount of acceleration operation and a driving force output from the transmission 12 to the driving force transmission system 10 (hereinafter referred to as a drive line torque). In the two-wheel driving where the driving force is transmitted only to the front wheels 21, the driving force obtained with reference to the drive line torque map 522 is determined to be the estimated driving force estimated to be transmitted to the front wheels 21.

In the example illustrated in FIG. 5, the axis of abscissas indicates the vehicle speed, and the axis of ordinate indicates the drive line torque. The drive line torque corresponding to the vehicle speed is depicted by polygonal lines corresponding to different amounts of acceleration operation (accelerator opening degrees). In the example illustrated in FIG. 5, first to sixth polygonal lines L1 to L6 are depicted. The first polygonal line L1 indicates the smallest amount of acceleration operation (for example, an accelerator opening degree of 10%). The sixth polygonal line indicates the largest amount of acceleration operation (for example, an accelerator opening degree of 100%). The second to fifth polygonal lines L2 to L5 indicate the drive line torques exerted at the amounts of acceleration amount between the first polygonal line L1 and the sixth polygonal line L6.

The control circuit 51 functions as the estimated driving force calculating circuit 511 to reference the drive line torque map 522 to determine the estimated driving force. At this time, the control circuit 51 may select, for reference, one of the first to sixth polygonal lines L1 to L6 that is closest to the amount of acceleration operation detected by the accelerator pedal sensor 506 or determine the estimated driving force by interpolating two polygonal lines between which the amount of acceleration operation detected by the accelerator pedal sensor 506 is present. The determined estimated driving force is compared with a driving force threshold arithmetically determined by the driving force threshold calculating circuit 512 in a process executed, in accordance with flowcharts described below, by the control circuit 51 functioning as the clutch control circuit 513

The driving force threshold calculating circuit 512 calculates the slip limit torque for the front wheels 21 in the two-wheel driving state based on an estimated value for a road surface friction coefficient for a road surface on which the four-wheel drive vehicle 1 travels and an estimated value for a load acting on the front wheels 21. The driving force threshold calculating circuit 512 then determines the driving force threshold according to the slip limit torque. In the present embodiment, the driving force threshold calculating circuit 512 also takes a transverse force acting on the front wheels 21 into account in calculating the slip limit torque. In this regard, the slip limit torque is the upper limit torque (driving force) that can be transmitted to the front wheels 21 without causing tires to run idly and beyond which an excessive propulsive force may be applied to the front wheels 21 with respect to the frictional force exerted between a tire ground contact surface and the road surface, causing the front wheels 21 to run idly. The slip limit torque increases with an increase in the road surface friction coefficient and the load acting on the front wheels 21, and is changed by the transverse force during turning. The transverse force can be estimated based on, for example, a detected value from a yaw rate sensor or the steering angle and the vehicle speed.

The road surface friction coefficient can be estimated by various well-known or widely-used methods. Specifically, the road surface friction coefficient may be estimated based, for example, on the distribution of the reflection intensity of light in images taken by an imaging apparatus that images the road surface or on the behavior of the vehicle during acceleration or deceleration or during turning. The load acting on the front wheels 21 may be estimated, for example, by multiplying a front-to-rear-wheel load ratio varying with the acceleration by the weight of the vehicle or based on a detected value from a load sensor assembled in a bearing of a hub unit that supports the front wheels 21 such that the front wheels 21 are rotatable.

In the present embodiment, the driving force threshold calculating circuit 512 calculates the slip limit torque based on the estimated value for the road surface friction coefficient, the estimated value for the load acting on the front wheels 21, and the transverse force acting on the front wheels 21 to determine the driving force threshold taking into account a margin based on the slip limit torque. In other words, the driving force threshold is set to be smaller than the slip limit torque by a predetermined amount. This processing is executed taking into consideration the following. The estimated values for the road surface friction coefficient and the load and the transverse force acting on the front wheels 21 are not necessarily so accurate but may include errors, and thus, the slip limit torque calculated based on the estimated values may also include an error. Furthermore, to reliably prevent the front wheels 21 from running idly during the two-wheel driving, the two-wheel driving state is preferably shifted earlier to the four-wheel driving state.

Figure 6:
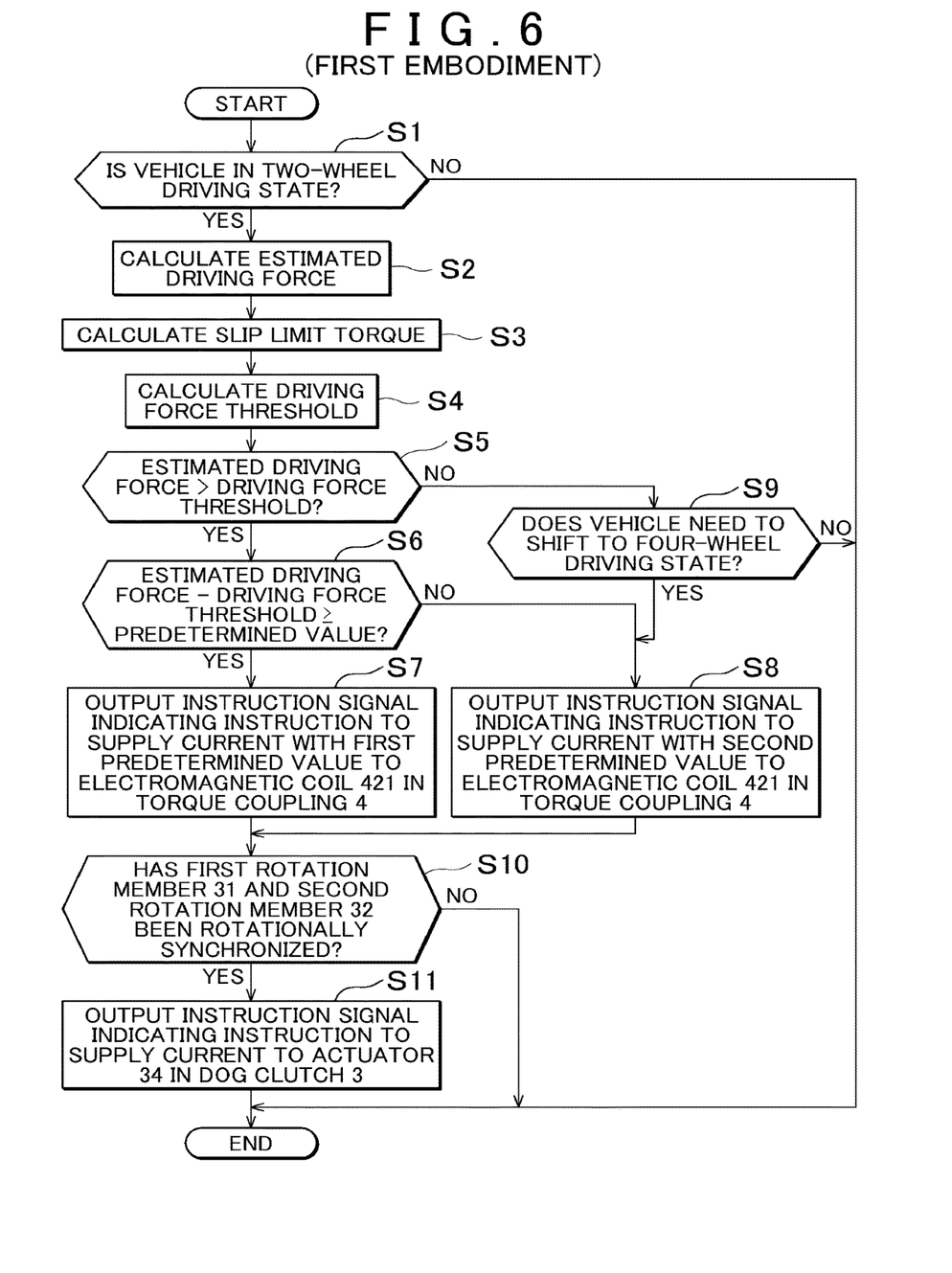
FIG. 6 is a flowchart illustrating a part of processing executed by the control apparatus.

FIG. 6 are flowcharts illustrating a part of the processing executed by the control circuit 51. The control circuit 51 executes the processing illustrated in the flowcharts at predetermined periods. When the estimated driving force is larger than the driving force threshold, the control circuit 51 sets the multi-disc clutch 41 in the torque coupling 4 to enable the driving force to be transmitted such that the turning force transmitted from the rear wheels 22 to the propeller shaft 15 through the multi-disc clutch 41 allows rotational synchronization of the first rotation member 31 and the second rotation member 32 in the dog clutch 3. Thus, the first rotation member 31 and the second rotation member 32 are meshed with each other. In the present embodiment, the turning force transmitted by the multi-disc clutch 41 is set larger when the estimated driving force is larger than the driving force threshold at least by a predetermined value than when the difference between the estimated driving force and the driving force threshold is smaller than the predetermined value.

A specific example of these processes will be sequentially described in accordance with the flowcharts in FIG. 6. In the flowcharts, processing in step S1 is executed by the control circuit 51 functioning as the estimated driving force calculating circuit 511. Processing in steps S2 and S3 is executed by the control circuit 51 functioning as the driving force threshold calculating circuit 512. Processing in steps S4 to S11 is executed by the control circuit 51 functioning as the clutch control circuit 513.

The control circuit 51 determines whether or not the driving state of the four-wheel drive vehicle 1 is the two-wheel driving state (step S1). When the driving state of the four-wheel drive vehicle 1 is not in the two-wheel driving state (S1: No), the control circuit 51 ends the processing in the flowcharts illustrated in FIG. 6 without executing processing in steps S2 to S11 described below. On the other hand, when the driving state of the four-wheel drive vehicle 1 is the two-wheel driving state (S1: Yes), the control circuit 51 references the drive line torque map 522 based on the vehicle speed and the amount of acceleration operation performed on the accelerator pedal 111 to calculate the estimated driving force (step S2).

Then, the control circuit 51 calculates the slip limit torque based on the estimated values for the road surface friction coefficient and the load and the transverse force acting on the front wheels 21 (step S3). The control circuit 51 further calculates the driving force threshold corresponding to the slip limit torque (step S4).

Then, the control circuit 51 compares the estimated driving force calculated in step S2 with the driving force threshold calculated in step S4 in terms of magnitude (step S5). When the estimated driving force is larger than the driving force threshold (S5: Yes), the control circuit 51 determines whether or not the difference between the estimated driving force and the driving force threshold is equal to or larger than the predetermined value (step S6). When the determination result indicates that the difference between the estimated driving force and the driving force threshold is equal to or larger than the predetermined value (S6: Yes), the control circuit 51 outputs an instruction signal to the current output circuit 53 indicating an instruction to supply a current with a first predetermined current value to the electromagnetic coil 421 in the torque coupling 4 (step S7). In the determination processing in step S6, when the difference between the estimated driving force and the driving force threshold is smaller than the predetermined value (S6: No), the control circuit 51 outputs an instruction signal to the current output circuit 53 indicating an instruction to supply a current with a second predetermined current value to the electromagnetic coil 421 in the torque coupling 4 (step S8).

The current supplied to the electromagnetic coil 421 in the processing in step S7 is larger than the current supplied to the electromagnetic coil 421 in the processing in step S8. That is, the first predetermined current value is larger than the second predetermined current value. Consequently, the turning force transmitted through the multi-disc clutch 41 in the torque coupling 4 is larger when the difference between the estimated driving force and the driving force threshold is equal to or larger than the predetermined value than when the difference is smaller than the predetermined value. Thus, when the difference between the estimated driving force and the driving force threshold is equal to or larger than the predetermined value, the rotation speed of the propeller shaft 15 increases more quickly, reducing the amount of time until the first rotation member 31 and the second rotation member 32 in the dog clutch 3 are rotationally synchronized. However, due to the rapid increase in the rotation speed of the propeller shaft 15, this case is more likely to suffer vibration or noise than the case where the difference between the estimated driving force and the driving force threshold is smaller than the predetermined value.

On the other hand, when, in the determination processing in step S5, the estimated driving force is larger than the driving force threshold (S5: No), the control circuit 51 determines whether or not to shift to the four-wheel driving state based on, for example, a difference in rotation speed between the front wheels 21 and the rear wheels 22 calculated based on the detected values from the first to fourth rotation speed sensors 501 to 504 (front and rear wheel rotation speed difference) (step S9). In other words, even when the estimated driving force is smaller than the driving force threshold, if, for example, a slip of the left front wheel 21L or the right front wheel 21R occurs to increase the front and rear wheel rotation speed difference, the two-wheel driving state shifts to the four-wheel driving state, where the driving force is also distributed to the rear wheels 22.

The determination result in step S9 indicates that the two-wheel driving state needs to shift to the four-wheel driving state (S9: Yes), the control circuit 51 executes processing in step S8. When the determination result is negative (S9: No), the control circuit 51 ends the processing in the flowcharts illustrated in FIG. 6.

After executing the processing in step S7 or step S8, the control circuit 51 further determines whether the first rotation member 31 and the second rotation member 32 in the dog clutch 3 have been rotationally synchronized (step S10). This determination depends on whether or not the following is small enough to allow the first rotation member 31 and the second rotation member 32a to mesh with each other: a difference between the rotation speed of the first rotation member 31 obtained from an average rotation speed of the right and left front wheels 21R and 21L and the rotation speed of the second rotation member 32 resulting from multiplication of the rotation speed of the propeller shaft 15 detected by the fifth rotation speed sensor 505 by a gear ratio of the front wheel gear mechanism 14.

Upon determining that the difference between the rotation speed of the first rotation member 31 and the rotation speed of the second rotation member 32 is small and that the first rotation member 31 and the second rotation member 32 have been rotationally synchronized (step S10: Yes), the control circuit 51 supplies a current to the actuator 34 to move the second rotation member 32 toward the first rotation member 31 in the axial direction to mesh the first rotation member 31 with the second rotation member 32. Then, the dog clutch 3 is set to enable the driving force to be transmitted, completing the shift to the four-wheel driving state.

Figure 7:
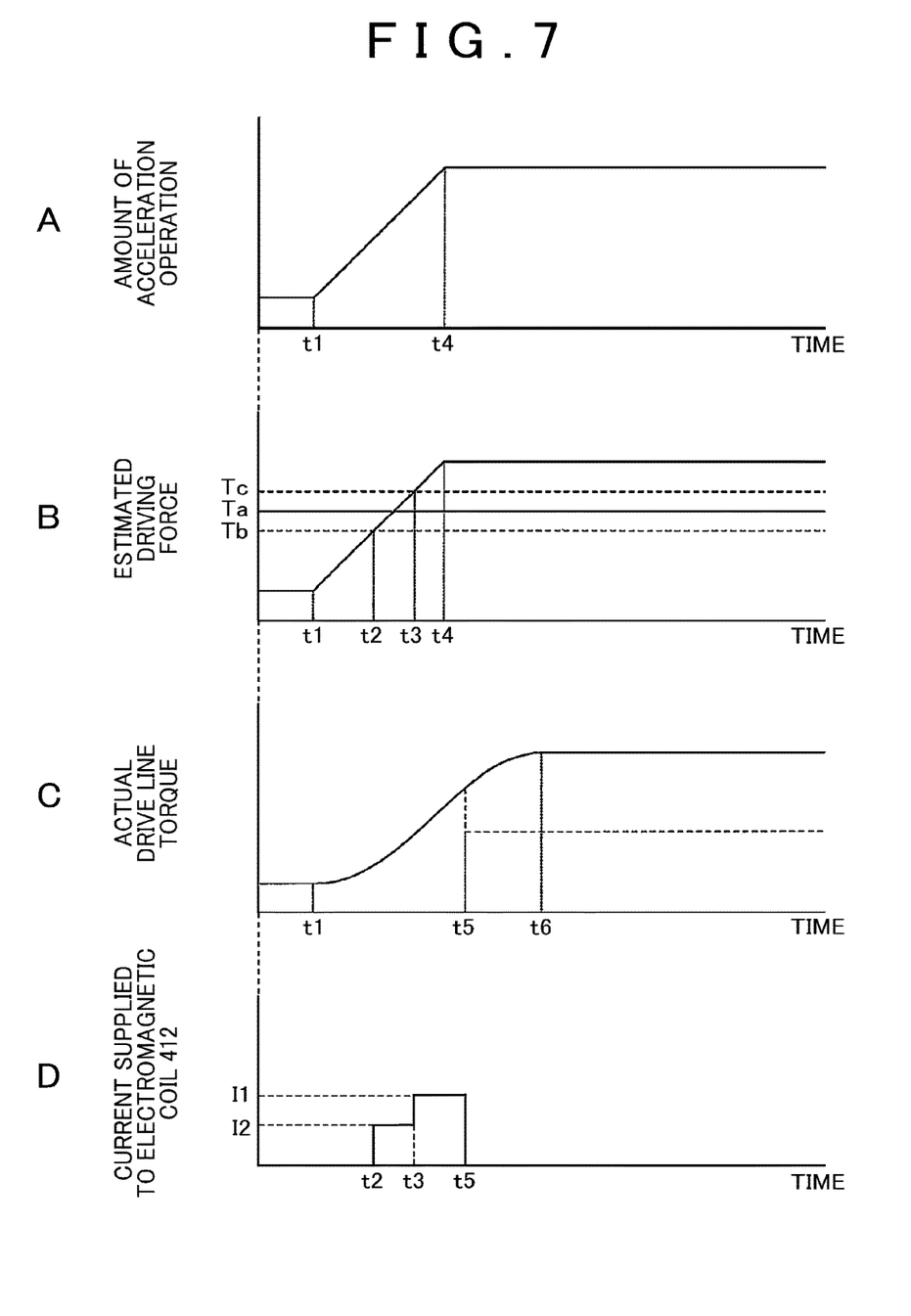
FIG. 7 includes graphs illustrating an example of an operation performed when a driver steps on an accelerator pedal while the four-wheel drive vehicle is traveling in a two-wheel driving state, in which Graph A illustrates temporal changes in the amount of acceleration operation, Graph B illustrates temporal changes in estimated driving force, Graph C illustrates temporal changes in a driving force actually transmitted from a transmission to a driving force transmission system, and Graph D illustrates temporal changes in a current supplied to an electromagnetic coil in a torque coupling.

FIG. 7 includes graphs illustrating an example of an operation performed when the driver steps on the accelerator pedal 111 while the four-wheel drive vehicle 1 is traveling in the two-wheel driving state. Graph A illustrates temporal changes in the amount of acceleration operation, Graph B illustrates temporal changes in estimated driving force, Graph C illustrates temporal changes in a driving force actually transmitted from the transmission 12 to the driving force transmission system 10 (actual drive line torque), and Graph D illustrates temporal changes in the current supplied to the electromagnetic coil 421 in the torque coupling 4. Graph B in FIG. 7 illustrates a slip limit torque Ta, a driving force threshold Tb, and a value (this value is hereinafter referred to as a second driving force threshold Tc) larger than the driving force threshold Tb by a predetermined value (the predetermined value in step S6 in the flowcharts in FIG. 6) along with the estimated driving force. A common time axis is used for the graphs A to D in FIG. 7.

When the amount of acceleration operation increases from time t1 to time t4 as illustrated in Graph A in FIG. 7, the estimated driving force calculated based on this amount of acceleration operation increases from time t1 to time t4 similarly to the amount of acceleration operation as illustrated in Graph B in FIG. 7. On the other hand, the driving force actually transmitted to the driving force transmission system 10 gradually increases from time 1 to time t5 with a temporal delay with respect to the increase in the amount of acceleration operation as illustrated in Graph C in FIG. 7.

When the estimated driving force is larger than the driving force threshold Tb at time t2 as illustrated in Graph B in FIG. 7, a current with the second current value 12 is supplied to the electromagnetic coil 421 as illustrated in Graph D in FIG. 7. When the estimated driving force is equal to or larger than the second driving force threshold Tc at time t3, a current with the first current value 11 is supplied to the electromagnetic coil 421. Then, when the supply of the current to the electromagnetic coil 421 allows the first rotation member 31 and the second rotation member 32 in the dog clutch 3 to be rotationally synchronized, the first rotation member 31 and the second rotation member 32 are coupled together at time t5. The four-wheel drive vehicle 1 thus shifts from the two-wheel driving state to the four-wheel driving state.

Consequently, the driving force of the engine 11 transmitted only to the front wheels 21 is also transmitted to the rear wheels 22 to reduce the burden on the front wheels 21, thus suppressing a possible slip (idle running) of the front wheels 21. In Graph C in FIG. 7, the driving force transmitted from the transmission 12 to the driving force transmission system 10 is illustrated by continuous lines. In this regard, temporal changes in the driving force transmitted to the front wheels 21 at time t5 and later are illustrated by dashed lines.

The above-described first embodiment produces effects disclosed below.

(1) The control circuit 51 in the ECU 5 compares the estimated driving force calculated based on the vehicle speed and the amount of acceleration operation with the driving force threshold defined according to the slip limit torque to set the multi-disc clutch 41 in the torque coupling 4 to enable the driving force to be transmitted such that the turning force transmitted from the rear wheels 22 to the propeller shaft 15 via the multi-disc clutch 41 allows the first rotation member 31 and the second rotation member 32 in the dog clutch 3 to be rotationally synchronized. The first embodiment thus allows the shift to the four-wheel driving state to be completed earlier than a case where the shift to the four-wheel driving state is started when a slip of the front wheels 21 occurs or a case where the shift to the four-wheel driving state is triggered by a change in the driving force actually transmitted to the driving force transmission system 10. A possible slip of the front wheels 21 is suppressed to allow the four-wheel drive vehicle 1 to travel more stably.

(2) The control circuit 51 in the ECU 5 passes a current through the electromagnetic coil 421 in the torque coupling 4 to set the multi-disc clutch 41, which is a friction clutch, to enable the driving force to be transmitted, thus rotating the propeller shaft 15. The multi-disc clutch 41 enables adjustment of the turning force transmitted according to the current supplied to the electromagnetic coil 421, thus allowing possible vibration or noise to be suppressed when the propeller shaft 15 is rotated.

(3) The control circuit 51 in the ECU 5 switches the current to be supplied to the electromagnetic coil 421 in the torque coupling 4 in a plurality of stages (in the present embodiment, two stages) according to the difference between the estimated driving force and the driving force threshold. Thus, the first rotation member 31 and the second rotation member 32 in the dog clutch 3 can be rotationally synchronized earlier as needed, with possible vibration or noise suppressed when the propeller shaft 15 is rotated.

(4) The control circuit 51 in the ECU 5 calculates the slip limit torque based on the estimated values for the road surface friction coefficient and the load acting on the front wheels 21 to set the driving force threshold according to the slip limit torque. Thus, a possible slip of the front wheels 21 can be properly suppressed when the driving force transmitted to the driving force transmission system 10 increases.

(5) The control circuit 51 in the ECU 5 calculates the slip limit torque taking into account the transverse force acting on the front wheels 21. Consequently, even when the four-wheel drive vehicle 1 turns, a possible slip of the front wheels 21 can be properly suppressed.

Now, a second embodiment of the present invention will be described with reference to FIG. 8.

Figure 8:
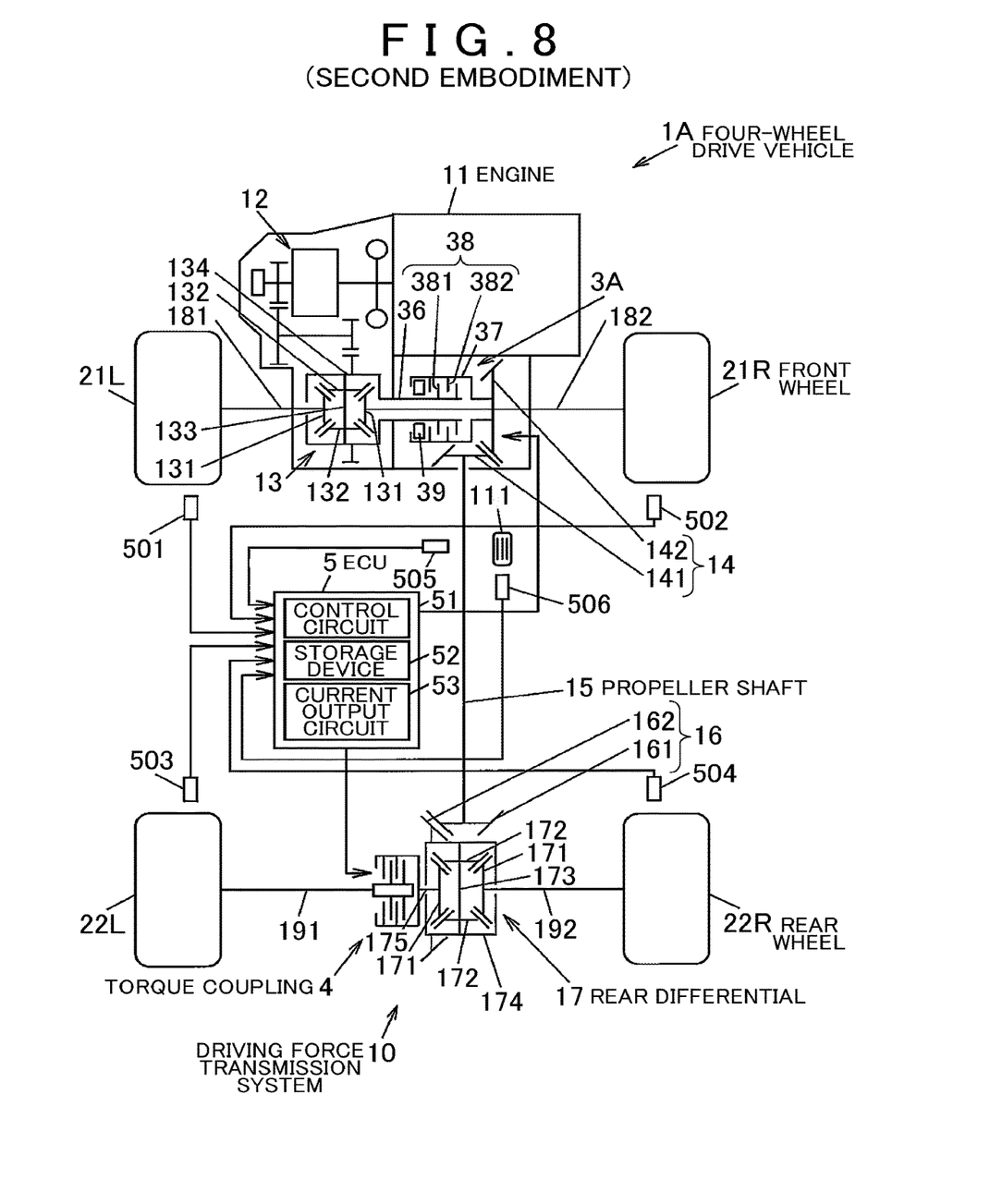
FIG. 8 is a schematic diagram of a four-wheel drive vehicle according to a second embodiment of the present invention.

FIG. 8 is a schematic diagram of a configuration of a four-wheel drive vehicle 1A according to a second embodiment of the present invention. The four-wheel drive vehicle 1A is different from the four-wheel drive vehicle 1 according to the first embodiment in a configuration in which the driving force is transmitted from the front differential case 134 to the ring gear 142 in the front wheel gear mechanism 14 via the friction clutch. In FIG. 8, components same as those in the four-wheel drive vehicle 1 according to the first embodiment are denoted by the same reference numerals as those in FIG. 1, with descriptions thereof omitted.

The four-wheel drive vehicle 1A according to the present embodiment has a torque coupling 3A instead of the dog clutch 3 according to the first embodiment. The torque coupling 3A has a first rotation member 36 shaped like a shaft and coupled to the front differential case 134 so as to be inhibited from rotating relative to the front differential case 134, a second rotation member 37 shaped like a bottomed cylinder and coupled to the ring gear 142 in the front wheel gear mechanism 14 so as to be inhibited from rotating relative to the ring gear 142, a multi-disc clutch 38 arranged between the first rotation member 36 and the second rotation member 37 and serving as a friction clutch, and a pressing mechanism 39 that presses the multi-disc clutch 38.

The multi-disc clutch 38 has a plurality of inner clutch plates 381 coupled to the first rotation member 36 so as to be movable in the axial direction with respect to the first rotation member 36 while being inhibited from rotating relative to the first rotation member 36, and a plurality of outer clutch plates 382 coupled to the second rotation member 37 so as to be movable in the axial direction with respect to the second rotation member 37 while being inhibited from rotating relative to the second rotation member 37. The pressing mechanism 39 may be formed of an electromagnetic clutch and a cam mechanism similarly to the torque coupling 4 on the rear wheel 22 side, described with reference to FIG. 3.

In the present embodiment, when the two-wheel driving state is shifted to the four-wheel driving state, the propeller shaft 15 may be rotated by the turning force transmitted via the multi-disc clutch 41 in the torque coupling 4 on the rear wheel 22 side as is the case with the first embodiment or by a turning force transmitted via the multi-disc clutch 38 in the torque coupling 3A on the front wheel 21 side. That is, when the two-wheel driving state is shifted to the four-wheel driving state, one of the following may be set to enable the driving force to be transmitted: the multi-disc clutch 38 in the torque coupling 3A on the front wheel 21 side, which enables blocking of transmission of the driving force from the engine 11 to the propeller shaft 15, and the multi-disc clutch 41 in the torque coupling 4 on the rear wheel 22 side, which enables blocking of transmission of the driving force from the propeller shaft 15 to the rear wheels 22. When the propeller shaft 15 is rotated by the turning force transmitted via the multi-disc clutch 38 in the torque coupling 3A on the front wheel 21 side, a dog clutch may be used for the torque coupling 4 on the rear wheel 22 side.

The present embodiment can also produce effects similar to the effects of the first embodiment. That is, when the estimated driving force is larger than the driving force threshold, one of the following is set to enable the driving force to be transmitted: the multi-disc clutch 38 in the torque coupling 3A on the front wheel 21 side, which corresponds to the first clutch of the present invention, and the multi-disc clutch 41 in the torque coupling 4 on the rear wheel 22 side, which corresponds to the second clutch of the present invention. Then, when the other multi-disc clutch is set to enable the driving force to be transmitted, the propeller shaft 15 has been rotating, allowing a quick shift to the four-wheel driving state.

Now, a third embodiment of the present invention will be described with reference to FIG. 9.

Figure 9:
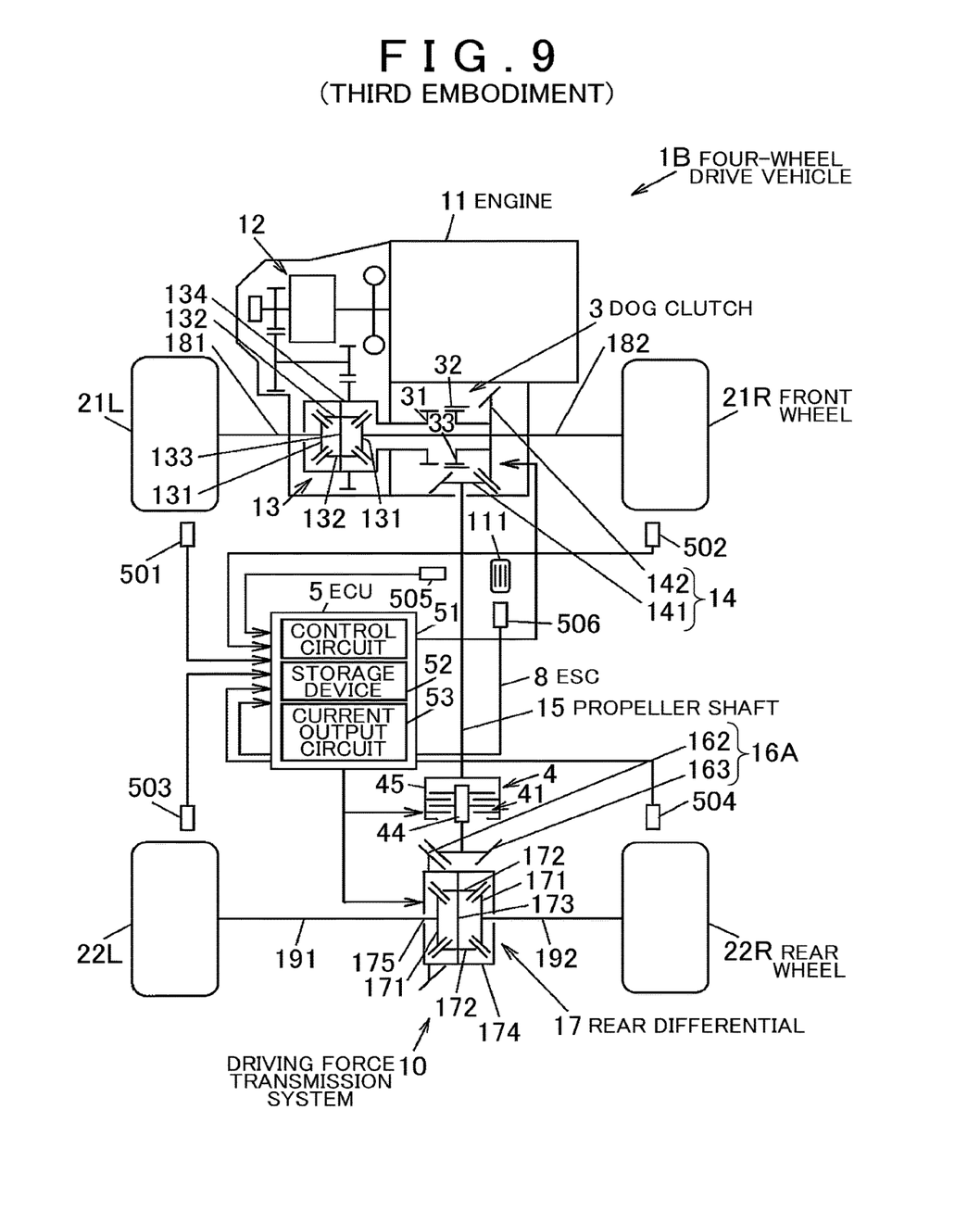
FIG. 9 is a schematic diagram of a four-wheel drive vehicle according to a third embodiment of the present invention.

FIG. 9 is a schematic diagram of a configuration of a four-wheel drive vehicle 1B according to a third embodiment of the present invention. The four-wheel drive vehicle 1B is different from the four-wheel drive vehicle 1 according to the first embodiment in the arrangement position of the torque coupling 4 in the driving force transmission system 10. In the four-wheel drive vehicle 1B, the left rear wheel drive shaft 191 is coupled to the left side gear 171 in the rear differential 17 so as to be inhibited from rotating relative to the left side gear 171. A rear wheel gear mechanism 16A includes the ring gear 162 fixed to the rear differential case 174 and a pinion gear shaft 163 meshing with the ring gear 162.

In the present embodiment, the housing 45 of the torque coupling 4 is coupled to the propeller shaft 15 via a cross joint not depicted in the drawings, and the inner shaft 44 is coupled to the pinion gear shaft 163 in the rear wheel gear mechanism 16A so as to be inhibited from rotating relative to the pinion gear shaft 163. During the four-wheel driving, the driving force of the engine 11 is transmitted to the rear differential case 174 of the rear differential 17 via the propeller shaft 15 and the torque coupling 4 and then distributed to the right and left rear wheels 22R and 22L.

As is the case with the first embodiment, when the estimated driving force is larger than the driving force threshold, the control circuit 51 in the ECU 5 sets the multi-disc clutch 41 in the torque coupling 4 to enable the driving force to be transmitted such that the propeller shaft 15 is rotated by the turning force transmitted from the rear wheels 22 via the rear differential 17 and the torque coupling 4. After the rotation of the propeller shaft 15 allows rotational synchronization of the first rotation member 31 and the second rotation member 32 in the dog clutch 3, the first rotation member 31 and the second rotation member 32 are coupled together.

The present embodiment can also produce effects similar to the effects of the first embodiment.

The present invention may be varied for implementation as needed without departing from the scope of the invention. For example, in the above-described embodiments, the case has been described where the front wheels 21 are main driving wheels and the rear wheels 22 are auxiliary driving wheels. However, the present invention is also applicable to a four-wheel drive vehicle in which the rear wheels serve as main driving wheels and the front wheels serve as auxiliary driving wheels.

In the above-described embodiments, the case has been described where the driving force threshold is set smaller than the slip limit torque. However, the present invention is not limited to this. The driving force threshold may be set equal to or larger than the slip limit torque. That is, the driving force threshold may be a value that increases and decreases with an increase/decrease in the slip limit torque. However, setting the driving force threshold smaller than the slip limit torque enables a quicker shift to the four-wheel driving state when the driver intends to perform a quick acceleration.

In the above-described embodiments, the case has been described where the current supplied to the electromagnetic coil 421 in the torque coupling 4 is increased according to the difference between the estimated driving force and the driving force threshold such that the current is increased with an increase in the difference in the plurality of stages. However, the present invention is not limited to this. A given current may be supplied to the electromagnetic coil 421 in the torque coupling 4 when the difference between the estimated driving force and the driving force threshold is equal to or larger than a predetermined value.

The torque coupling 4 is not limited to the configuration that allows the multi-disc clutch 41 to be pressed by the cam thrust of the cam mechanism 43 actuated by the electromagnetic clutch 42. The torque coupling 4 may be configured such that the turning force of an electric motor is converted into a pressing force in the axial direction by the cam mechanism or the like to press the multi-disc clutch 41. Alternatively, the torque coupling 4 may be configured such that the multi-disc clutch 41 is pressed by a piston subjected to the pressure of hydraulic oil fed from a hydraulic pressure source.

What is claimed is:

1. A control apparatus for a four-wheel drive vehicle comprising:
an estimated driving force calculating circuit that calculates an estimated driving force estimated to be transmitted to main driving wheels to which a driving force of a driving source is constantly transmitted, wherein
the four-wheel drive vehicle includes the main driving wheels, auxiliary driving wheels to which the driving force of the driving source is transmitted via a driving shaft that transmits the driving force in a front-rear direction of the vehicle, a first clutch that enables blocking of transmission of the driving force from the driving source to the driving shaft, and a second clutch that enables blocking of transmission of the driving force from the driving shaft to the auxiliary driving wheels,
the control apparatus is mounted in the four-wheel drive vehicle to control the first and second clutches,
during two-wheel driving in which the transmission of the driving force through the first and second clutches is blocked, the estimated driving force calculating circuit calculates the estimated driving force applied to the main driving wheels based on a vehicle speed and an amount of acceleration operation performed by a driver,
during the two-wheel driving, the control apparatus allows one of the first and second clutches to transmit the driving force when the estimated driving force is larger than a driving force threshold defined according to a slip limit torque for the main driving wheels,
the first clutch is a dog clutch that transmits the driving force by meshing between recess portions formed in a first rotation member and protruding portions formed on a second rotation member, and the second clutch is a friction clutch that transmits the driving force by friction between clutch plates,
when the estimated driving force is larger than the driving force threshold, the control apparatus allows the second clutch to transmit the driving force such that a turning force transmitted from the auxiliary driving wheels to the driving shaft through the second clutch allows the first rotation member and the second rotation member in the first clutch to be rotationally synchronized, and
the control apparatus sets a larger value for the turning force transmitted through the second clutch when the estimated driving force is larger than the driving force threshold at least by a predetermined value than when a difference between the estimated driving force and the driving force threshold is smaller than the predetermined value.

2. The control apparatus for a four-wheel drive vehicle according to claim 1, wherein
the control apparatus sets the driving force threshold smaller than the slip limit torque.

3. The control apparatus for a four-wheel drive vehicle according to claim 2, wherein
the control apparatus calculates the slip limit torque based on an estimated value for a road surface friction coefficient and an estimated value for a load acting on the main driving wheels.

4. The control apparatus for a four-wheel drive vehicle according to claim 1, wherein
the control apparatus calculates the slip limit torque based on an estimated value for a road surface friction coefficient and an estimated value for a load acting on the main driving wheels.

5. The control apparatus for a four-wheel drive vehicle according to claim 4, wherein
the control apparatus further takes into account a transverse force acting on the main driving wheels in calculating the slip limit torque.

6. The control apparatus for a four-wheel drive vehicle according to claim 1, wherein
the first clutch includes a first actuator that allows the first clutch to transmit torque and the second clutch includes a second actuator that allows the second clutch to transmit torque, and
the control apparatus varies a current supplied to the second actuator based on whether or not the estimated driving force is larger than the driving force threshold at least by a predetermined value.

* * * * *